United States Patent [19]

Okamoto

[11] Patent Number: 5,136,698

[45] Date of Patent: Aug. 4, 1992

[54] METHOD FOR SELECTIVE BACK-TRACKING IN A HIERARCHICAL SYSTEM CONTAINING A FLAG WHICH INDICATES THE VALIDITY OF A CHOICE-POINT

[75] Inventor: Toshio Okamoto, Tokyo, Japan

[73] Assignee: Kabushiki Kaisha Toshiba, Kawasaki, Japan

[21] Appl. No.: 406,417

[22] Filed: Sep. 13, 1989

[30] Foreign Application Priority Data

Sep. 14, 1988 [JP] Japan .................. 63-228520

[51] Int. Cl.⁵ ........................... G06F 12/00
[52] U.S. Cl. ................ 395/375; 364/DIG. 1; 364/281.1; 364/275; 395/1
[58] Field of Search .................. 395/375, 1

[56] References Cited

U.S. PATENT DOCUMENTS 4,931,931  6/1990  Syre et al. ............... 395/650
5,016,164  5/1991  Srivastava ............... 395/375

FOREIGN PATENT DOCUMENTS 62-495446  3/1987  Japan .

OTHER PUBLICATIONS

Warren, "An Abstract Prolog Instruction Set," SRI International, Technical Note 309, Oct. 1983, pp. 1–30.

Primary Examiner—Thomas C. Lee
Assistant Examiner—Paul Harrity
Attorney, Agent, or Firm—Foley & Lardner

[57] ABSTRACT

A method of back-tracking in a computer processing operation in which the programmer can be provided with a number of different types of the back-track controlling, from which a suitable one can freely be selected in accordance with the need of the programmer. In this method, a flag is provided in each choice point, for indicating a type of back-track controlling, and a stack which contains an address of a choice point specified as a present choice point by a present choice point register and an address of a preceding choice point which is immediately preceding the present choice point is utilized in changing indication of the flag.

8 Claims, 9 Drawing Sheets

```
/* source
a : - b, ! ,c,d.
a : - e,f.
*/
```

FIG.4

```
/* source
a: - b, ! ,c,d.
a: - e,f.
*/ a/0:
        try_me_else L3       (1)
L1:
        mark_cut1            (2)
        allocate             (3)
        call b/0,0           (4)
        cut                  (5)
        call c/0,0           (6)
        deallocate
        execute d/0

L3:
        trust_me_else_fail

L2:
        allocate
        call e/0,0
        deallocate
        execute f/0
```

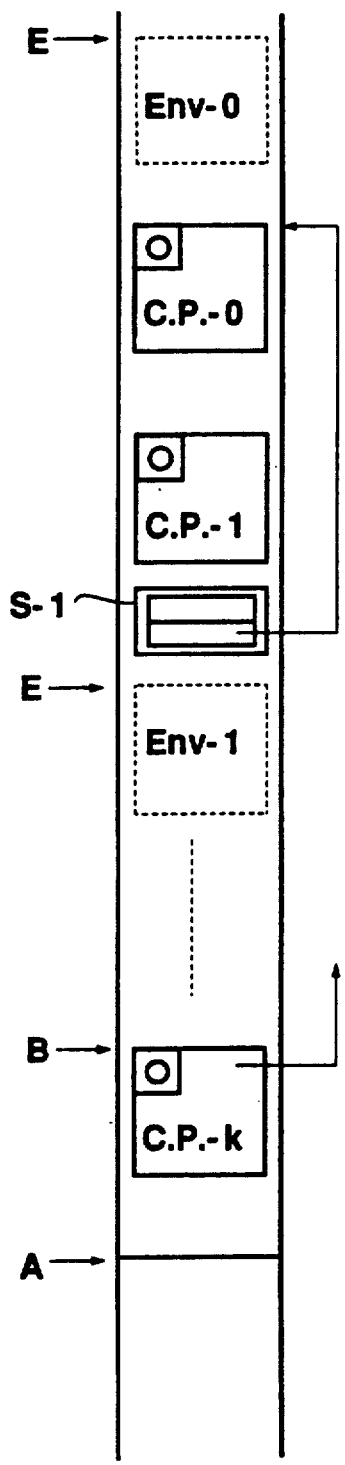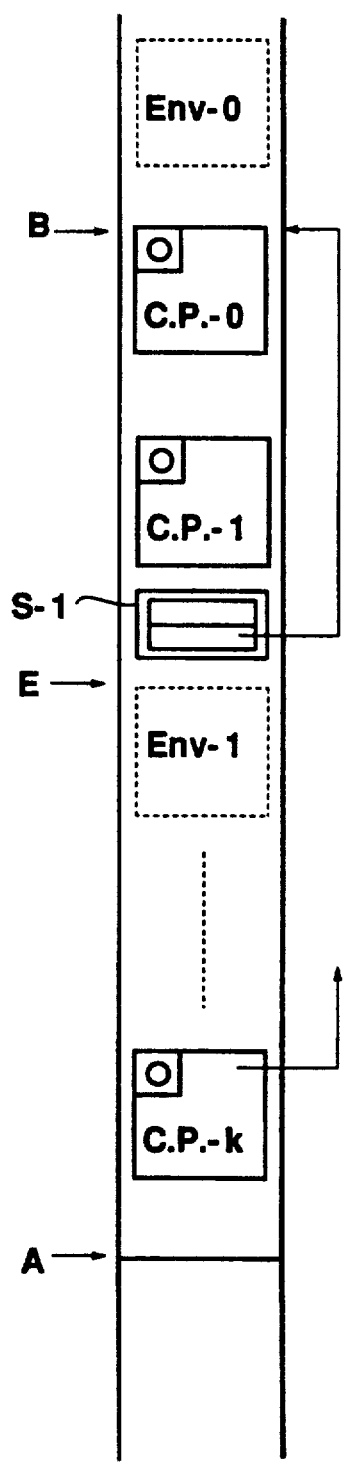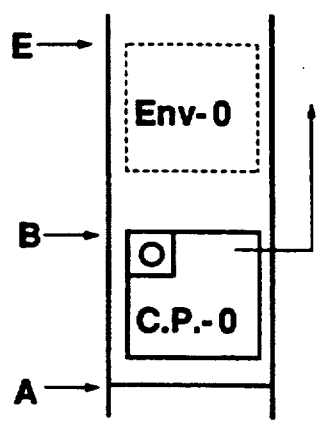
FIG.6 (A)  FIG.6 (B)  FIG.6 (C)

FIG.7

```
/* source
a: - b,$,c,d.
a: - e,f.
*/ a/0:
        try_me_else L3      (1)

L1:
        mark_cut1           (2)
        allocate            (3)
        call b/0,0          (4)
        scut                (5)
        call c/0,0          (6)
        deallocate
        execute d/0

L3:
        trust_me_else_fail

L2:
        allocate
        call e/0,0
        deallocate
        execute f/0
```

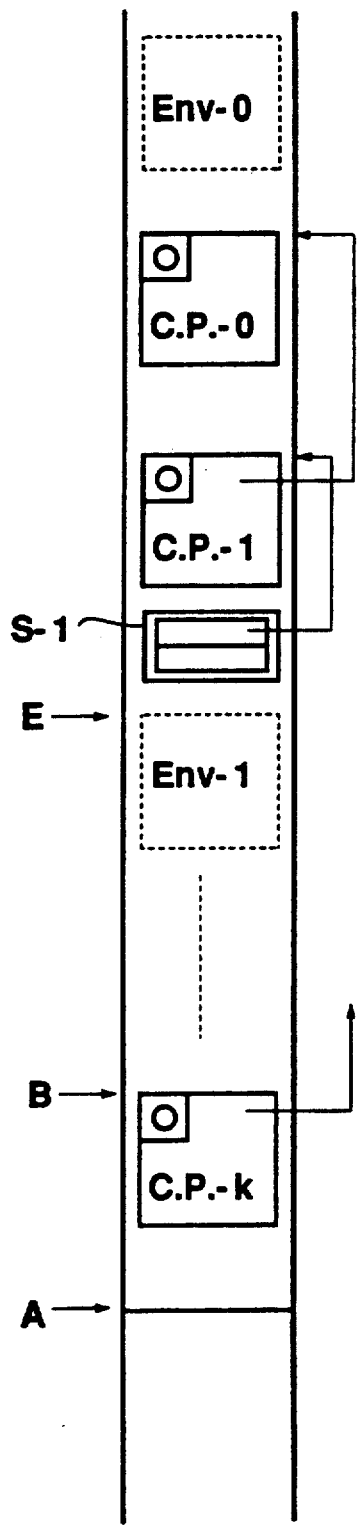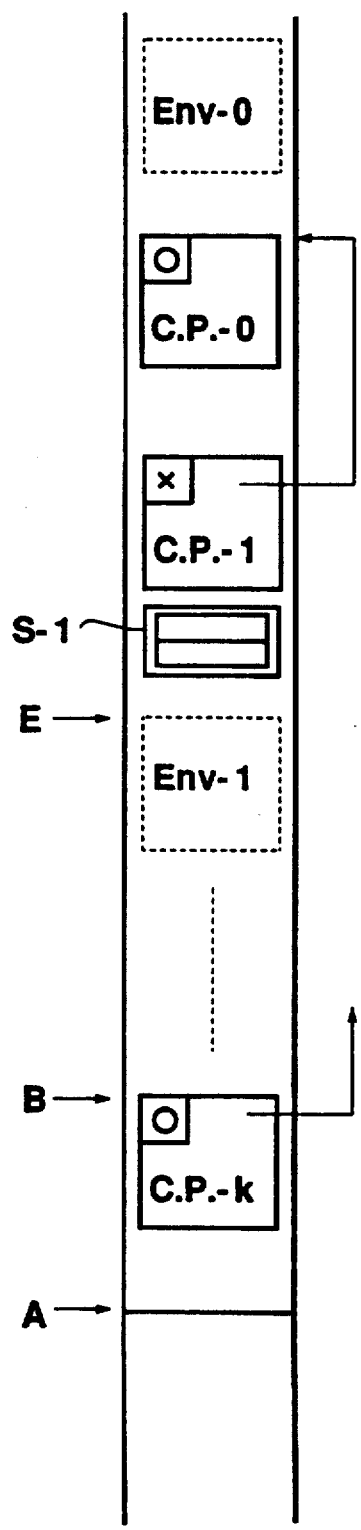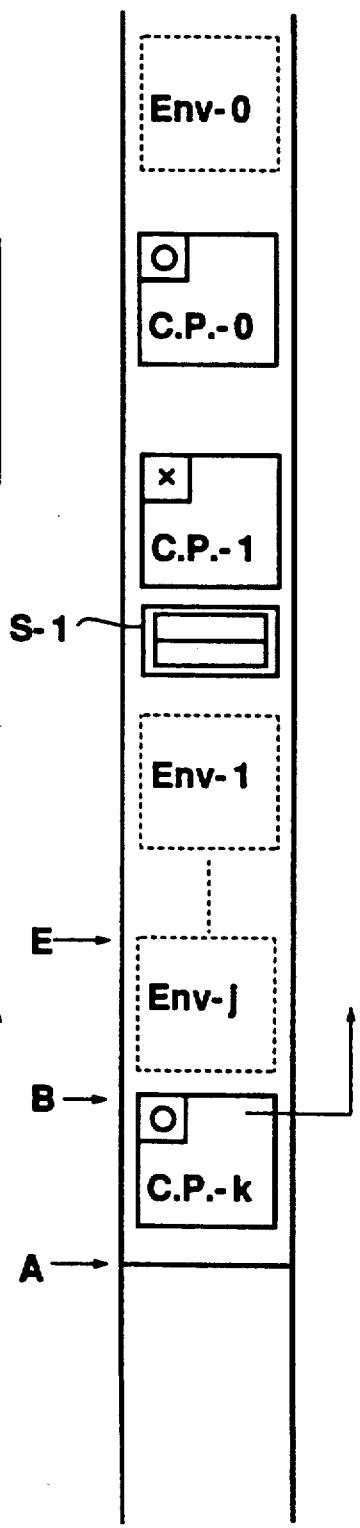

FIG.9 (A)   FIG.9 (B)
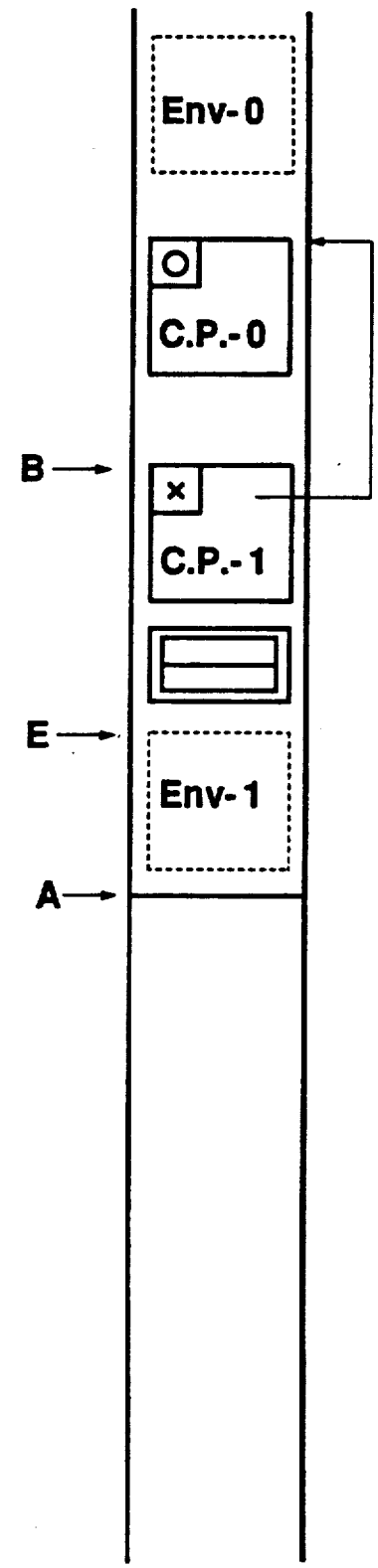
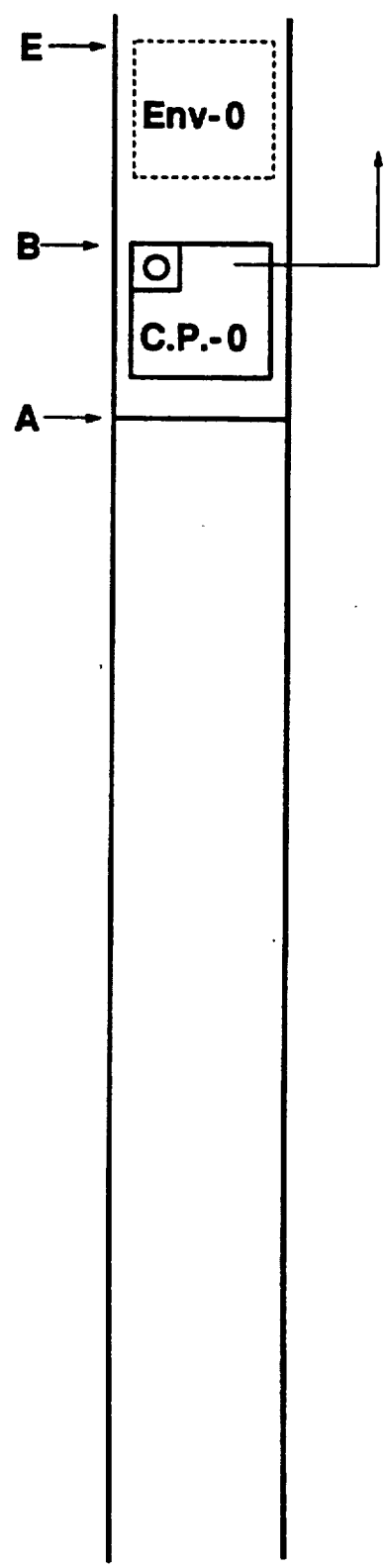

METHOD FOR SELECTIVE BACK-TRACKING IN A HIERARCHICAL SYSTEM CONTAINING A FLAG WHICH INDICATES THE VALIDITY OF A CHOICE-POINT

BACKGROUND OF THE INVENTIONS

1. Field of the Invention

The present invention relates to a method of back-tracking to be performed by a computer, operating under commands of a program usually written in a logic type language such as PROLOG.

2. Description of the Background Art

Under a program written in a logic type language such as PROLOG, a computer is required to be capable of performing a process called back-tracking, in which an execution of an alternative predicate is automatically attempted in a case of a failure of an execution of a certain predicate.

Namely, as in an exemplary program of FIG. 1(A) which commands performing of the sequence of processes illustrated in FIG. 1(B), when there are two admissible clauses "b, !, c, d" and "e, f" for a certain predicate "a" to be executed, i.e., the predicate "a" is executable if one or the other of these possibilities "b, !, c, d" and "e, f" can successfully be executed, the first one "b, !, c, d" will be attempted first, and only when the execution of this first one "b, !, c, d" has failed, an attempt is automatically made for an execution of another alternative one "e, f". Here, in attempting the execution of the alternative one "e, f", it is necessary to restore initial conditions used in the abortive attempt for the execution of the first one "b, !, c, d", in order to maintain consistency.

Conventionally, for the purpose of assisting a programmer in handling such back-tracking processes effectively, there is provided a back-track controlling means which enable the programmer to explicitly control the performance of the back-tracking processes, within the framework of logic type languages. Such a back-tracking control means is often called an operator, among which a most notable example being a cut operator in PROLOG.

In the example of FIG. 1 (A) above, there is a cut operator "!" which will be carried out after the successful execution of the predicate "b". This cut operator functions such that when the process reaches this cut operator "!", the back-tracking of the predicate "a" will not take place any more. Thus, when the execution of the predicate "b" fails in the attempt to perform the first clause "b, !, c, d", the back-tracking to the alternative clause "e, f" will be performed as the failure of the execution of the predicate "b" occurs before the cut operator "!" is reached, as indicated by a dashed line in FIG. 1(B), whereas when the execution of the predicate "c" fails, the back-tracking will not be performed as this failure of executing the predicate "c" occurred after the cut operator "!" has been reached, so that the failure of the execution of the predicate "a" will be confirmed at this point, without attempting the alternative clause "e, f". The process may then go back further to a superior predicate preceding the predicate "a" for which the predicate "a" is a part of an admissible clause.

However, conventionally, such a back-track controlling means is actually realized by a computer in essentially a single manner, so that it has not been possible to provide the programmer with a number of different types of such back-track controlling means, from which a suitable one can freely be selected in accordance with the need of the programmer. As a consequence, the programming in a logic type language has been very inflexible as far as the back-track controlling means is concerned, such that in order to facilitate sufficient handling of the back-tracking, a highly skillful programming has been indispensable, which subsequently complicates the program itself, in which case the debugging is more difficult and running time becomes longer.

SUMMARY OF THE INVENTION

It is therefore an object of the present invention to provide a method of back-tracking in a computer processing in which the programmer can be provided with a number of different types of the back-track controlling means, from which a suitable one can freely be selected in accordance with the need of the programmer, such that the effective handling of the back-tracking by the programmer is possible with a simple program so that the flexibility in programming can be enhanced.

According to one aspect of the present invention, there is provided a method of back-tracking in a computer processing, comprising the steps of: (a) for each predicate to be executed, creating a choice point containing: values of arguments of this predicate at a beginning of execution of this predicate; register values of registers necessary for carrying out back-tracking; and a flag indicating this choice point as either valid or invalid; (b) with respect to a certain choice point, creating a stacking containing; an address of a choice point specified as a present choice point by a present choice point register; and an address of a preceding choice point which is immediately preceding the present choice point; (c) resetting indication of the flag of a certain choice point from valid to invalid, or from invalid to valid, by using the address of the present choice point in the stacking; (d) in back-tracking for a certain predicate whose flag indicates that it is valid, back-tracking according to the register values of the registers in the present choice point; (e) in back-tracking for a certain predicate whose flag indicates that it is invalid, resetting a register value of the present choice point register from a location of the present choice point to a location of a nearest valid choice point superior to the choice point corresponding to that predicate; and back-tracking according to the register values of the registers in the nearest valid choice point.

According to another aspect of the present invention, there is provided a method of back-tracking in a computer processing, comprising the steps of: (a) for each predicate to be executed, creating a choice point containing: values of arguments of this predicate at a beginning of execution of this predicate; register values of registers necessary for carrying out back-tracking; and a flag indicating some integer value; (b) with respect to a certain choice point, creating a stacking containing; an address of a choice point specified as a present choice point by a present choice point register; and an address of a preceding choice point which is immediately preceding the present choice point; (c) changing indication of the flag of a certain choice point from one integer value to another integer value, by using the address of the present choice point in the stacking; (d) in back-tracking for a certain predicate whose flag indicates an integer n, resetting a register value of the present choice point register from a location of the present choice point to a location of an n-th mearedt valid choice superior to the choice point corresponding to that predicate; and back-tracking according to the register values of the registers in the n-th nearest valid choice point.

Other features and advantages of the present invention will become apparent from the following description taken in conjunction with the accompanying drawings.

BRIEF DESCRIPTION OF THE DRAWINGS

FIG. 4 is an illustration of a part of a program written in PROLOG and corresponding WAM commands compiled, for explaining a first type of back-track control in one embodiment of the method of back-tracking according to the present invention.

FIGS. 6(A), (B) and (C) are another diagrammatic illustrations of the states of the stack area in the memory of FIG. 2 (B) in a course of back-tracking using the first type of back-track control.

FIG. 7 is an illustration of a part of a program written in PROLOG and corresponding WAM commands compiled, for explaining a second type of back-track control in one embodiment of the method of back-tracking according to the present invention.

FIGS. 8(A), (B) and (C) are diagrammatic illustrations of the states of the stack area in the memory of FIG. 2(B) in a course of back-tracking using the second type of back-track control.

FIGS. 9(A) and (B) are another diagrammatic illustrations of the states of the stack area in the memory of FIG. 2(B) in a course of back-tracking using the second type of back-track control.

DETAILED DESCRIPTION OF THE PREFERRED EMBODIMENTS

Figure 1:
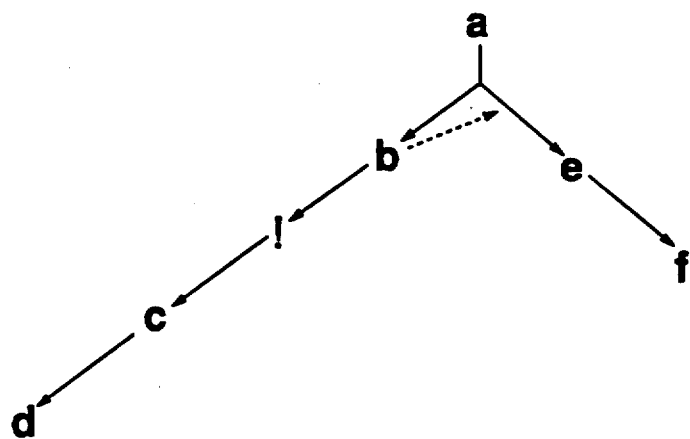
FIGS. 1 (A) and (B) are an illustration of a part of a program written in PROLOG and a diagram illustrating corresponding sequence of processes, respectively, for explaining a conventional back-tracking process.
Figure 2:
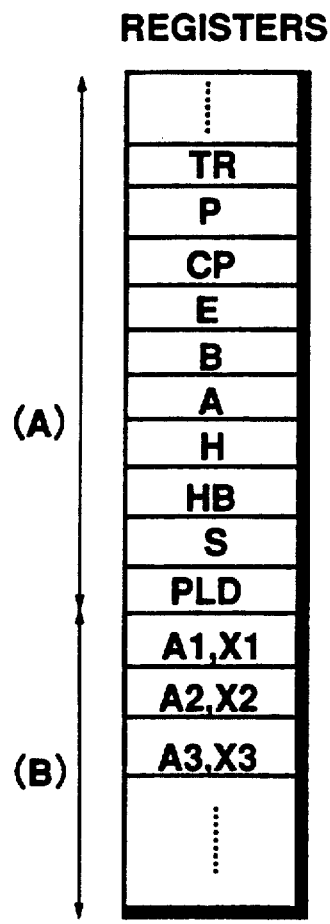
FIGS. 2(A) and (B) are diagrammatic illustrations of a register and a memory of a computer, respectively, by which the method of back-tracking according to the present invention is to be carried out.
Figure 2:
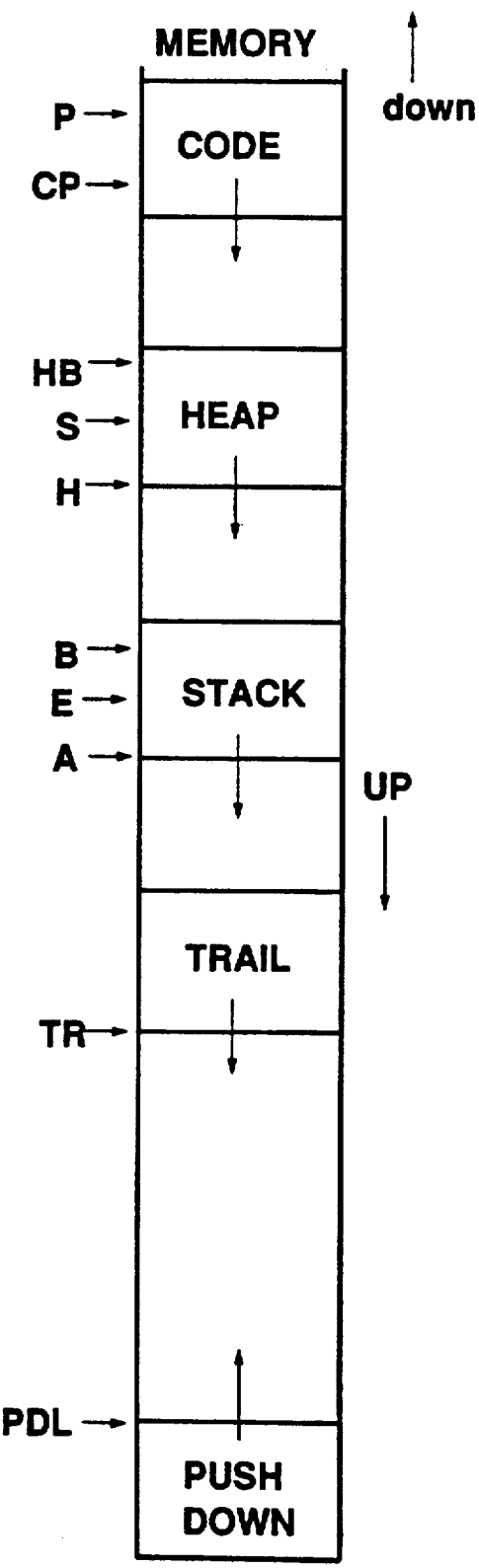

In the embodiment of the method of back-tracking according to the present invention to be described below, a computer to be used is assumed to possess registers and a memory of the form shown in FIGS. 2(A) and (B), respectively.

Namely, the memory is divided into five areas comprising a code, a heap, a stack, a trail, and a push down. The code is the area in which program codes are stored. The heap is the area in which global data are stored. The stack is the area in which local data and register values during executions of processes are stored. The trail is the area in which a state of unification is stored. The push down is the area to be utilized for other temporary data processing. These areas can be extended in directions indicated by arrows inside the memory in FIG. 2(B), and locations in the memory are identified invertedly, i.e., upper location in the memory is at lower position in FIG. 2(B) and vice versa, as is customary. These areas are managed by register values of the various registers, as indicated on left side of the memory. The registers comprise those having the register values for managing the memory, indicated as (A) in FIG. 2(A), as well as others having register values indicating arguments of predicates involved and other temporary quantities to be stored, indicated as (B) in FIG. 2(A).

Also, PROLOG is used as an exemplary logical type language to command this computer, and a PROLOG compiler called WAM (Warren Abstract Machine) described by D. H. D. Warren in "An Abstract Prolog Instruction Set", Technical note 309, Artificial Intelligence Center, SRI International, October 1983, is used. Here, however, the WAM commands described by Warren are extended to accommodate cut operators which he does not consider in the above reference.

Now, in operating under such commands, blocks called environments (Env) and choice points (C.P.) will be utilized in the stack area of the memory of the computer. Locations of the environment and the choice point are to be indicated by register values of a register E and a register B, respectively, while a top of the stack area is to be indicated by a register value of a register A.

Figure 3:
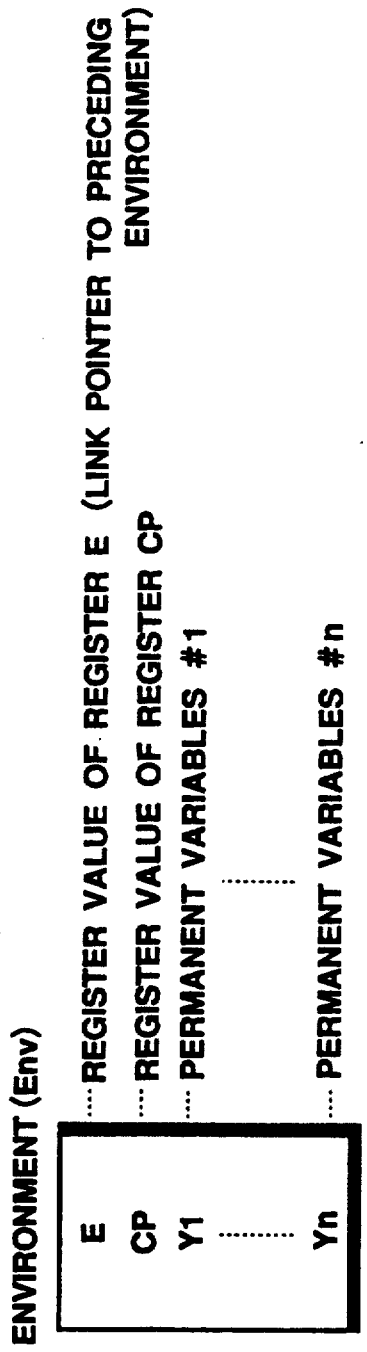
FIGS. 3(A) and (B) are diagrammatic illustrations of an environment and a choice point, respectively, to be used in the method of back-tracking according to the present invention.
Figure 3:
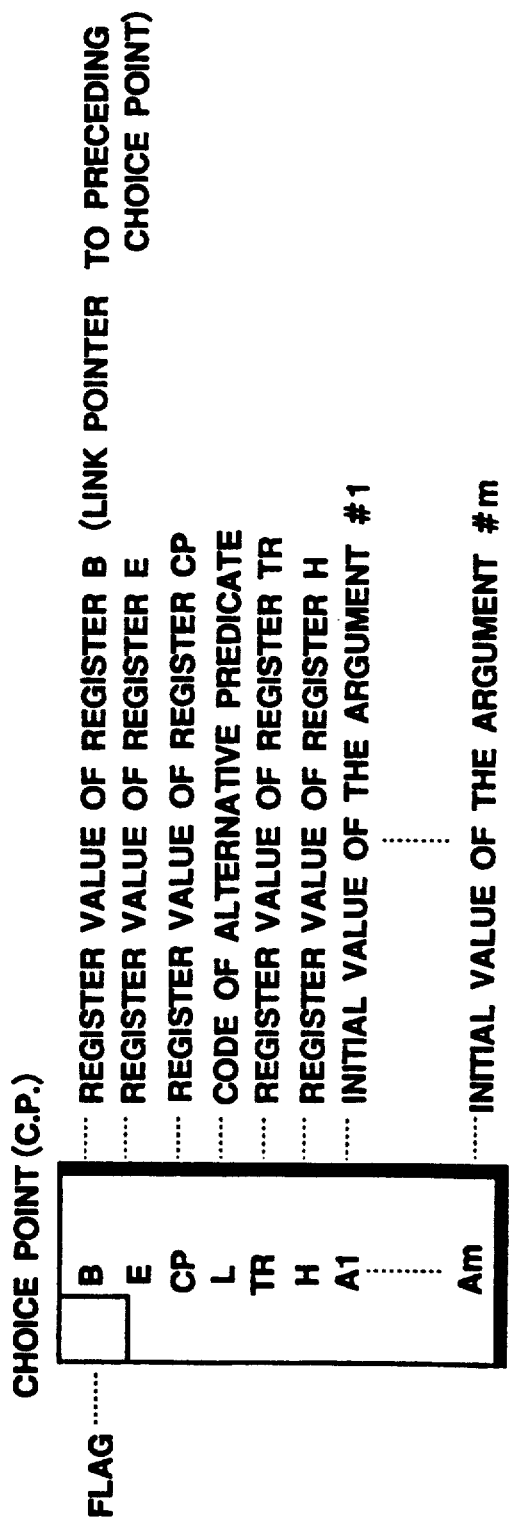

An environment is to be created whenever a clause is to be executed and, as shown in FIG. 3(A), each environment contains values of permanent variables $Y_1, -, Y_n$ which are required to be kept unchanged during the execution of that clause, as well as register values of registers E and CP. In particular, the register value of the register E which serves as a link pointer to the preceding environment is contained at a top of the environment.

On the other hand, a choice point is to be created for the sake of back-tracking whenever a predicate is to be executed. As shown in FIG. 3(B), each choice point contains an address L in the code area at which an alternative predicate of that predicate is stored, so as to locate the alternative predicate to be attempted in a case of the failure of that predicate, and initial values of arguments $A_1, -, A_m$ of that predicate prior to the attempt for the execution of that predicate, which are required to be given to the alternative predicate when the alternative predicate is to be attempted. In addition, each choice point contains register values of registers B, E, CP, TR, and H. In particular, the register value of the register B which serves as a link pointer to the preceding choice point is contained at a top of the choice point. Furthermore, each choice point carries a flag for indicating validity of the choice point itself.

These environments and choice points will be created in the stack area whenever necessary and deleted whenever their uses are over.

Now, one embodiment of a method of back-tracking according to the present invention, in which a programmer can be provided with two types of back-track controls will be described.

Figure 5:
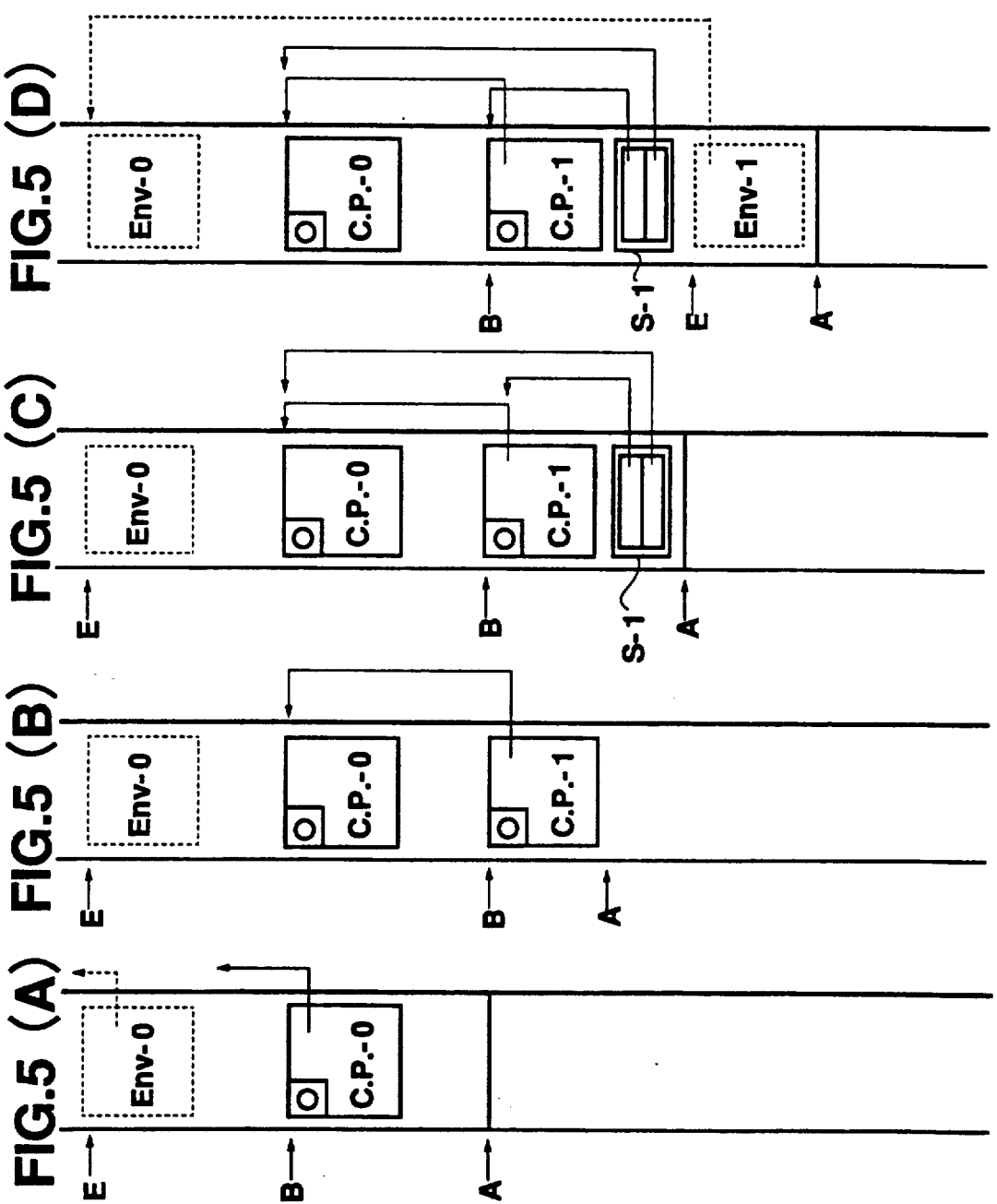
FIGS. 5(A), (B), (C), and (D) are diagrammatic illustrations of the states of the stack area in the memory of FIG. 2(B) in a course of back-tracking using the first type of back-track control.

Referring now to FIGS. 4 to 6, a first type of back-track control in this embodiment will be explained. This first type of back-track control is essentially equivalent to a usual cut operator.

FIG. 4 shows a part of a source program written in PROLOG which involves a usual cut operator "!", and corresponding WAM commands compiled.

Now, before executing the predicate "a", an environment Env-0 and a choice point C.P. -0 corresponding to a superior predicate for which the predicate "a" belongs to are present in the stack area, with register E and B indicating the locations of the environment Env-0 and the choice point C.P.-0, respectively, as shown in FIG. 5(A). The environment is represented by a dashed square, whereas the choice point is represented by a solid square. In addition, a pointer between the environments is represented by a dashed arrow, whereas a pointer between the choice point is represented by a solid arrow.

Then, in executing a command "try_me_else L3" at a line (1), a choice point C.P.-1 corresponding to the predicate "a" is created, with the register value of the register B in FIG. 5(A) stored at the top of the choice point as a link pointer to a preceding choice point, as shown in FIG. 5(B). The link thus created is indicated by a solid arrow in FIG. 5(B). Also, the flag of the choice point C.P.-1 is set to "o" to indicate that this choice point is valid. Furthermore, the register value of the register B is changed at this point to indicate the present choice point which is the choice point C.P.-1.

Next, in executing a command "mark_cut 1" at a line (2), a stacking S-1 containing an address of the present choice point C.P.-1 as a top value and an address of the preceding choice point C.P.-0 as a bottom value is created at the top of the stacking area, as shown in FIG. 5(C). The stacking is represented by a double square, and the links made by this stacking S-1 are also indicated in FIG. 5(C). This command "mark_cut 1" at a line (2) and a command "cut" at a line (5) make up a pair of commands corresponding to the cut operator "!" in the source program.

Next, in executing a command "allocate" at a line (3), an environment Env-1 corresponding to a clause "b, !, c, d" is created at the top of the stack area, with the register value of the register E in FIG. 5(A) stored at the top of the environment as a link pointer to a preceding environment, as shown in FIG. 5(D).

After these, the execution of the predicate "b" is attempted by the command "call b/0,0" at a line (4).

When this execution of the predicate "b" succeeds, the cut operator "!" will be reached next. At this point, the register value of the register E is still indicating the environment Env-1 because it is still in a middle of executing the clause "b, !, c, d", but the register value of the register B may not be indicating the choice point C.P.-1 any more. Such a case arises when the execution of the predicate "b", called for another clause making up the predicate "b", in which case additional choice points are created as the predicates of that another clause are executed. Thus, the register value of the register B may be indicating the choice point C.P.-k, as shown in FIG. 6(A).

Now, when the command "cut" at a line (5) is performed, the register value of the register E is utilized to locate the stacking S-1 which is right below the position indicated by the register E, and then by using the bottom value of the stacking S-1, the register value of the register B is reset to indicate the choice point C.P.-0, as shown in FIG. 6(B).

As a result, before the execution of the next predicate "c" is attempted by the command "call c/0,0" at a line (6), all the choice points above the choice point C.P.-0 are deleted, including the choice point C.P.-1 for the predicate "a", as shown in FIG. 6(C), so that the further back-tracking for the predicate "a" becomes impossible, since the choice point C.P.-1 contained information necessary in performing back-tracking for the predicate "a". Therefore, when the execution of the predicate "c" fails, the back-tracking is performed according to the choice point C.P.-0, in other words, the failure of the execution of the predicate "a" is determined as soon as the execution of the predicate "c" fails in this case, as the cut operator "!" is supposed to function.

Referring now to FIGS. 7 to 9, a second type of back-track control in this embodiment will be explained. This second type of back-track control utilizes a special cut operator "$" which functions differently from the usual cut operator "!" utilized in the first type of back-track control.

FIG. 7 shows a part of a source program written in PROLOG in which the special cut operator "$" replaces the cut operator "$" of the first type of back-track control, and corresponding WAM commands compiled. Here, the only difference between this program of FIG. 7 and that of FIG. 4 is that a command "cut" corresponding to the cut operator "!" of the first type of back-track control is replaced by a new command "scut" corresponding to the special cut operator "$" of this second type of back-track control, so that procedures for lines (1) to (4) are identical to those explained above in conjunction with FIGS. 5(A) to (D), which will not be repeated.

Now, as in the first type of back-track control explained above, after the completion of the line (4), the register value of the register E is still indicating the environment Env-1 because it is still in a middle of executing the clause "b, $, c, d", but the register value of the register B may not be indicating the choice point C.P.-1 any more. Such a case arises when the execution of the predicate "b" called for another clause making up the predicate "b", in which case additional choice points are created as the predicates of that another clause are executed. Thus, the register value of the register B may be indicating the choice point C.P.-k, as shown in FIG. 8(A).

Then, when the command "scut" at a line (5) is performed, the register value of the register E is utilized to locate the stacking S-1 which is right below the position indicated by the register E, and then by using the top value of the stacking S-1, the flag of the choice point indicated by this top value which is the choice point C.P.-1 in this case is reset to "x" to indicate that this choice point C.P.-1 is invalid, as shown in FIG. 8(B).

In a case of this second type of back-track control, the back-tracking is performed in a usual manner so long as the flag of the choice point indicated by the register value of the register B indicates that this choice point is valid, as in a situation shown in FIG. 8(C).

On the other hand, when the flag of the choice point indicated by the register value of the register B indicates that this choice point is invalid, as in a situation shown in FIG. 9(A), the back-tracking is performed after the register value of the register B is reset to indicate the nearest valid choice point among the preceding choice points which is the choice point C.P.-0 in this case, as shown in FIG. 9(B). In other words, in back-tracking from an invalid choice point, the register value of the register B is reset to indicate a choice point immediately preceding this invalid choice point as long as the immediately preceding choice point is a valid one. When the immediately preceding choice point is also an invalid one, the register value of the register B is reset to indicate a choice point next-to-immediately preceding this invalid choice point as long as this next-to-immediately preceding choice point is a valid one, and so on.

Thus, with this second type of back-track control, when the next predicate "c" is executed by the command "call c/0,0" at a line (6) and this execution failed, the back-tracking is performed for the alternative predicate of the predicate "b" as in the usual back-tracking, since the choice point for the predicate "b" carries a flag indicating "o". In addition, if this back-tracking for the predicate "b" also fails, the back-tracking proceeds according to the choice point C.P.-0, since the choice point C.P.-1 is to be skipped as it is invalid, and will subsequently be deleted along with all the choice points above the choice point C.P.-0 as the register value of the register B is reset to indicate the nearest valid choice point among the preceding choice points, so that when the further back-tracking for the predicate "a" becomes impossible.

As described, in this embodiment, two types of the back-track controls can be provided, and the programmer can utilize desired one of these two by simply choosing either a usual cut operator "!" or a special cut operator "$" in a program.

It is to be noted that in the above embodiment, the choice point utilizes the flag which can have two values "o" or "x" only, as only two types of back-track controls are involved. However, this feature may be modified such that, for instance, the flag can have n different integer values which invalidates n preceding choice points, so that it is possible to provide n different types of back-track controls.

Besides this, many modifications and variations of the above embodiments may be made without departing from the novel and advantageous features of the present invention. Accordingly, all such modifications and variations are intended to be included within the scope of the appended claims.

What is claimed is:

1. A computer implemented method of back-tracking in a computer processing operation, comprising the steps of:
   (a) for a predicate that is to be executed, creating a choice point containing:
      values of arguments of this predicate at a beginning of execution of this predicate;
      register values of registers necessary for carrying out back-tracking; and
      a flag indicating this choice point as either valid or invalid;
   (b) with respect to a certain choice point, creating a stack containing;
      an address of said certain choice point specified as a present choice point by a present choice point register; and
      an address of a preceding choice point which is immediately preceding the present choice point;
   (c) resetting the flag of a certain choice point from valid to invalid, or from invalid to valid, by using the address of the present choice point in the stack;
   (d) in back-tracking for a certain predicate, determining whether said certain predicate contains a flag which indicates that said certain predicate is valid or invalid;
   (e) for a certain predicate whose flag indicates that it is valid,
      back-tracking according to the register values of the registers in the present choice point;
   (f) for a certain predicate whose flag indicates that it is invalid,
      resetting a register value of the present choice point register from a location of the present choice point to a location of a nearest valid choice point superior to the choice point corresponding to that predicate; and
      back-tracking according to the register values of the registers in the nearest valid choice point.

2. The method of claim 1, wherein the computer processing operation is performed under a program written in a logic type language, and wherein the step (b) is performed in response to a presence of a particular operator in the program, the particular operator having two distinctive and interchangeable types, while the step (c) is performed in response to a type of the particular operator present in the program.

3. The method of claim 1, wherein register values of registers contained in each choice point include a register value of a register indicating a location of an alternative predicate to be attempted in a back-tracking, and a register value of a register indicating a location of the preceding choice point.

4. The method of claim 1, wherein the computer processing operation further utilizes an environment containing permanent variables for each clause to be executed, and wherein the stack is created such that when the back-tracking starts, the stack is located adjacent to a newest environment.

5. A computer implemented method of back-tracking in a computer processing operation, comprising the steps of:
   (a) for a predicate that is to be executed, creating a choice point containing:
      values of arguments of this predicate at a beginning of execution of this predicate;
      register values of registers necessary for carrying out back-tracking; and
      a flag indicating some integer value;
   (b) with respect to a certain choice point, creating a stack containing;
      an address of said certain choice point specified as a present choice point by a present choice point register; and
      an address of a preceding choice point which is immediately preceding the present choice point;
   (c) changing the flag of a certain choice point from one integer value to another integer value, by using the address of the present choice point in the stack;
   (d) in back-tracking for a certain predicate, determining whether said certain predicate contains a flag which indicates an integer n;
   (e) for a certain predicate whose flag indicates an integer n,
      resetting a register value of the present choice point register from a location of the present choice point to a location of an n-th nearest valid choice point superior to the choice point corresponding to that predicate; and
      back-tracking according to the register values of the registers in the n-th nearest valid choice point.

6. The method of claim 5, wherein the computer processing operation is performed under a program written in a logic type language, and wherein the step (b) is performed in response to a presence of a particular operator in the program, the particular operator having n distinctive and interchangeable types where n is an integer, while the step (c) is performed in response to a type of the particular operator present in the program.

7. The method of claim 5, wherein register values of registers contained in each choice point include a register value of a register indicating a location of an alternative predicate to be attempted in a back-tracking, and a register value of a register indicating a location of the preceding choice point.

8. The method of claim 5, wherein the computer processing operation further utilizes an environment containing permanent variables for each clause to be executed, and wherein the stack is created such that when the back-tracking starts, the stack is located adjacent to a newest environment.

* * * * *